United States Patent [11] 3,552,588

| [72] | Inventor | William E. Todd |
| | | Cincinnati, Ohio |
| [21] | Appl. No. | 810,038 |
| [22] | Filed | Apr. 30, 1968 |
| | | Division of Ser. No. 568,683, July 28, 1966, now Patent No. 3,412,878 |
| [45] | Patented | Jan. 5, 1971 |
| [73] | Assignee | The E. W. Buschman Company, Inc. |
| | | Cincinnati, Ohio |
| | | a corporation of Ohio |

[54] TRANSFER MECHANISM FOR BLOCK HANDLING APPARATUS
2 Claims, 21 Drawing Figs.

[52] U.S. Cl. .................................................. 214/89
[51] Int. Cl. .................................................. B25j 5/02
[50] Field of Search .................................... 214/1B, 1B2, 1B4, 89, 16.42

[56] References Cited
FOREIGN PATENTS
| 903,439 | 8/1962 | Great Britain ................ | 214/16.42 |
| 1,183,003 | 12/1964 | Germany ...................... | 214/1B2 |

Primary Examiner—Gerald M. Forlenza
Assistant Examiner—George F. Abraham
Attorney—Wood, Herron and Evans ABSTRACT: A transfer device that is composed of a mobile frame that spans a first conveyor. The frame is movable in a direction transverse to the first conveyor. A load lifting means is vertically movable within said frame from a position straddling the first conveyor to a position above the first conveyor. The lifting means being capable of engaging a load that has accumulated on the first conveyor as it moves from its straddling position to a position above the first conveyor. The frame moves the load transversely to the first conveyor and the lifting means is then lowered to deposit the load on a second conveyor adjacent and parallel to the first conveyor.

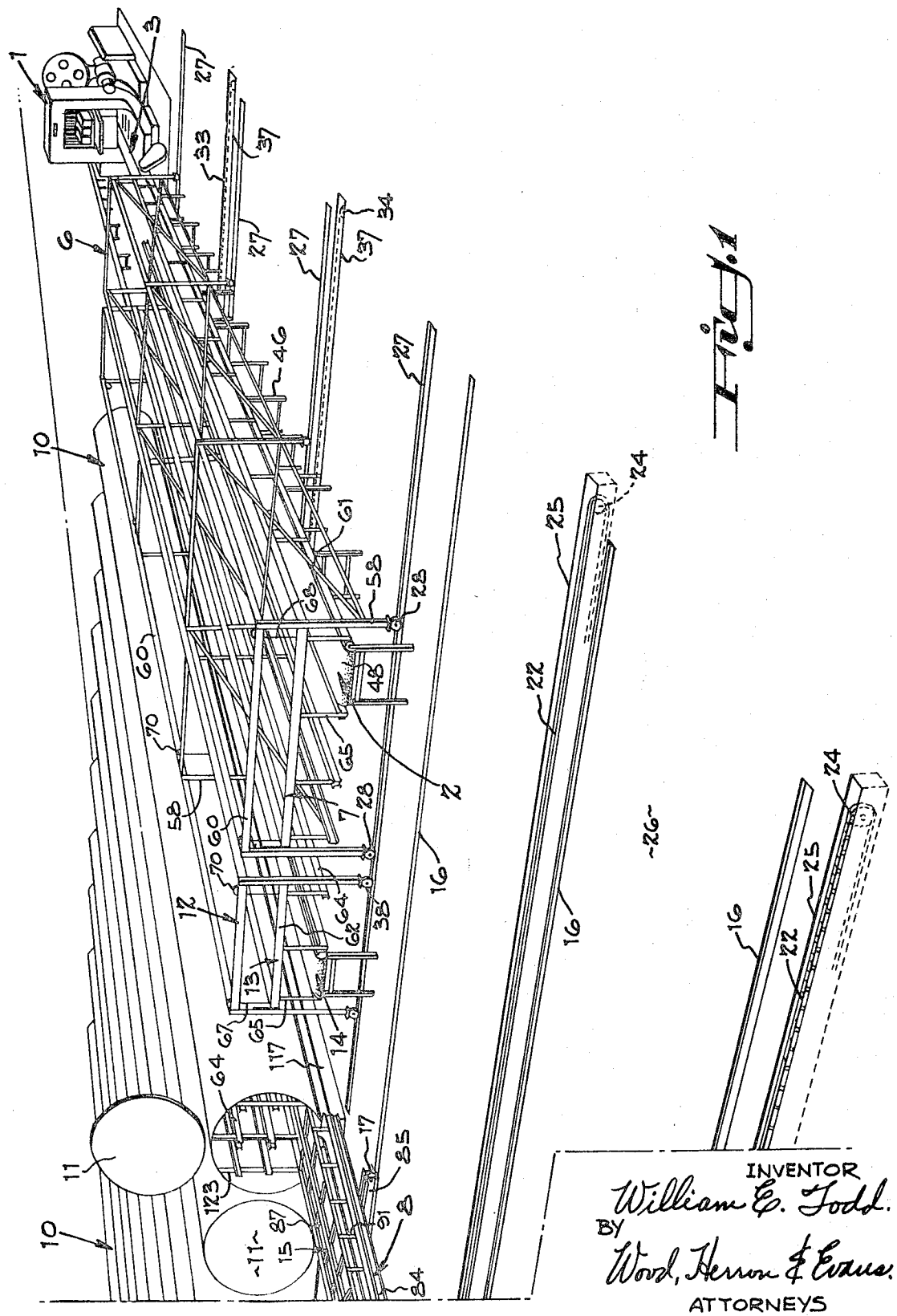

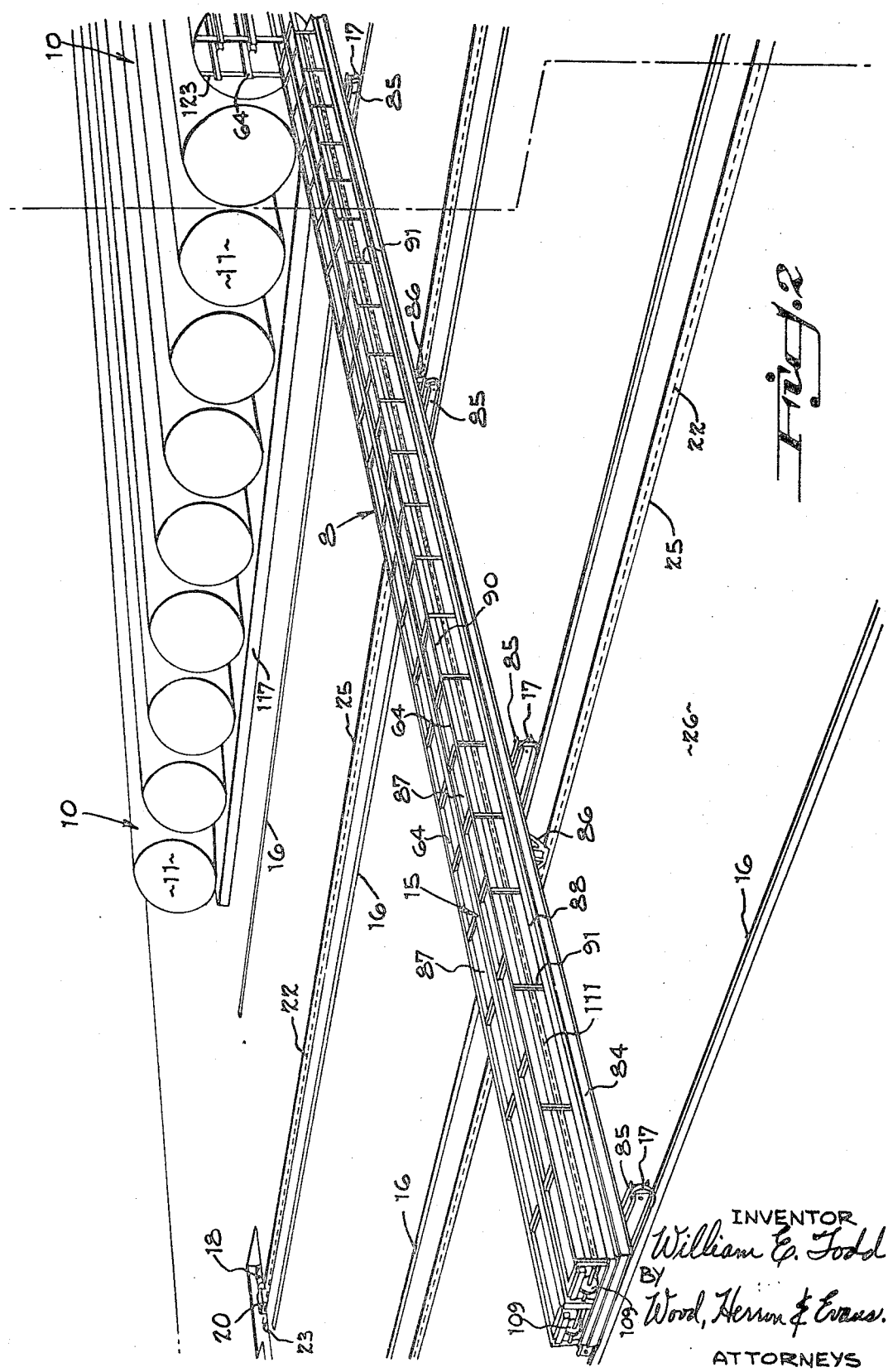

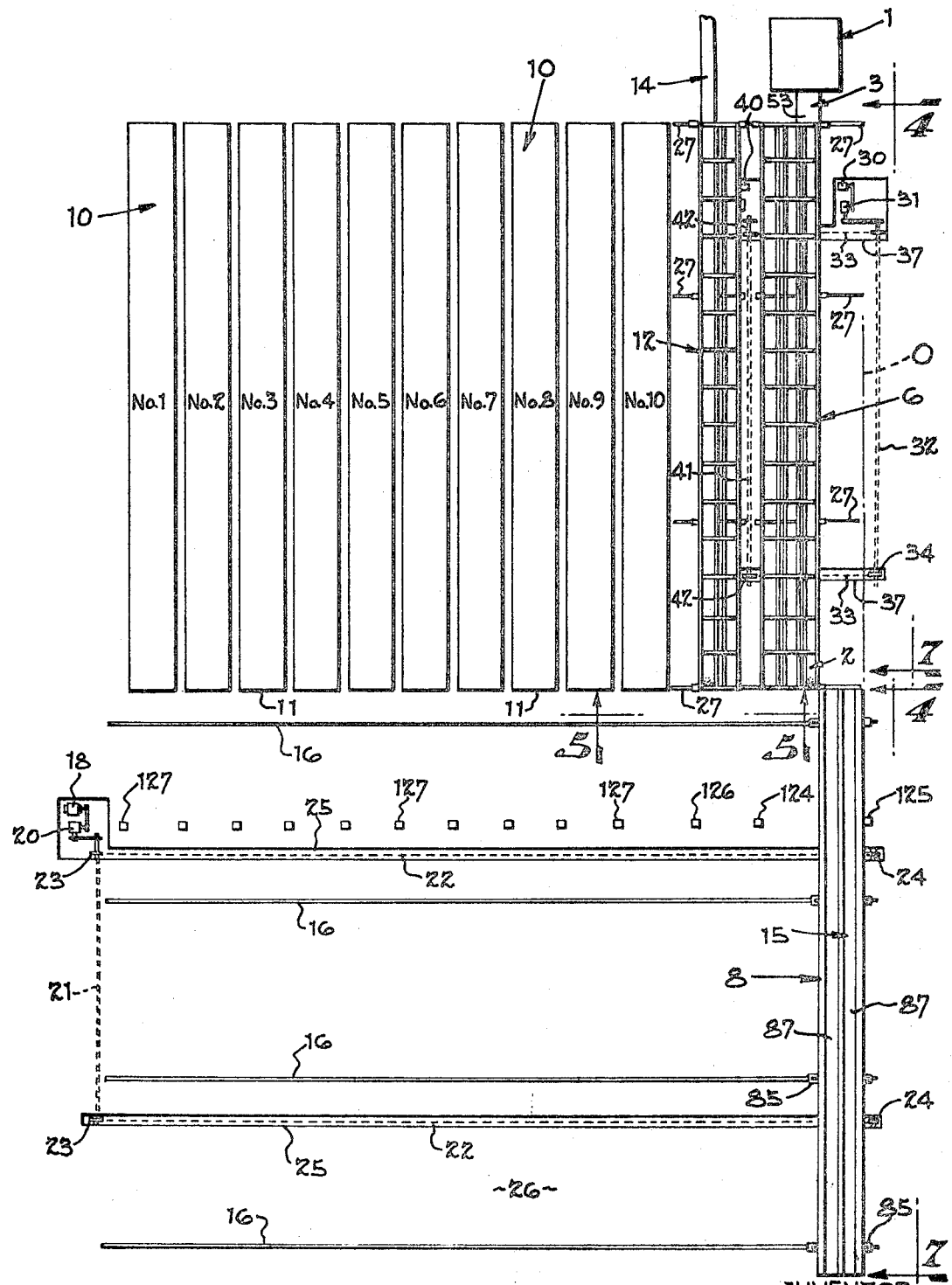

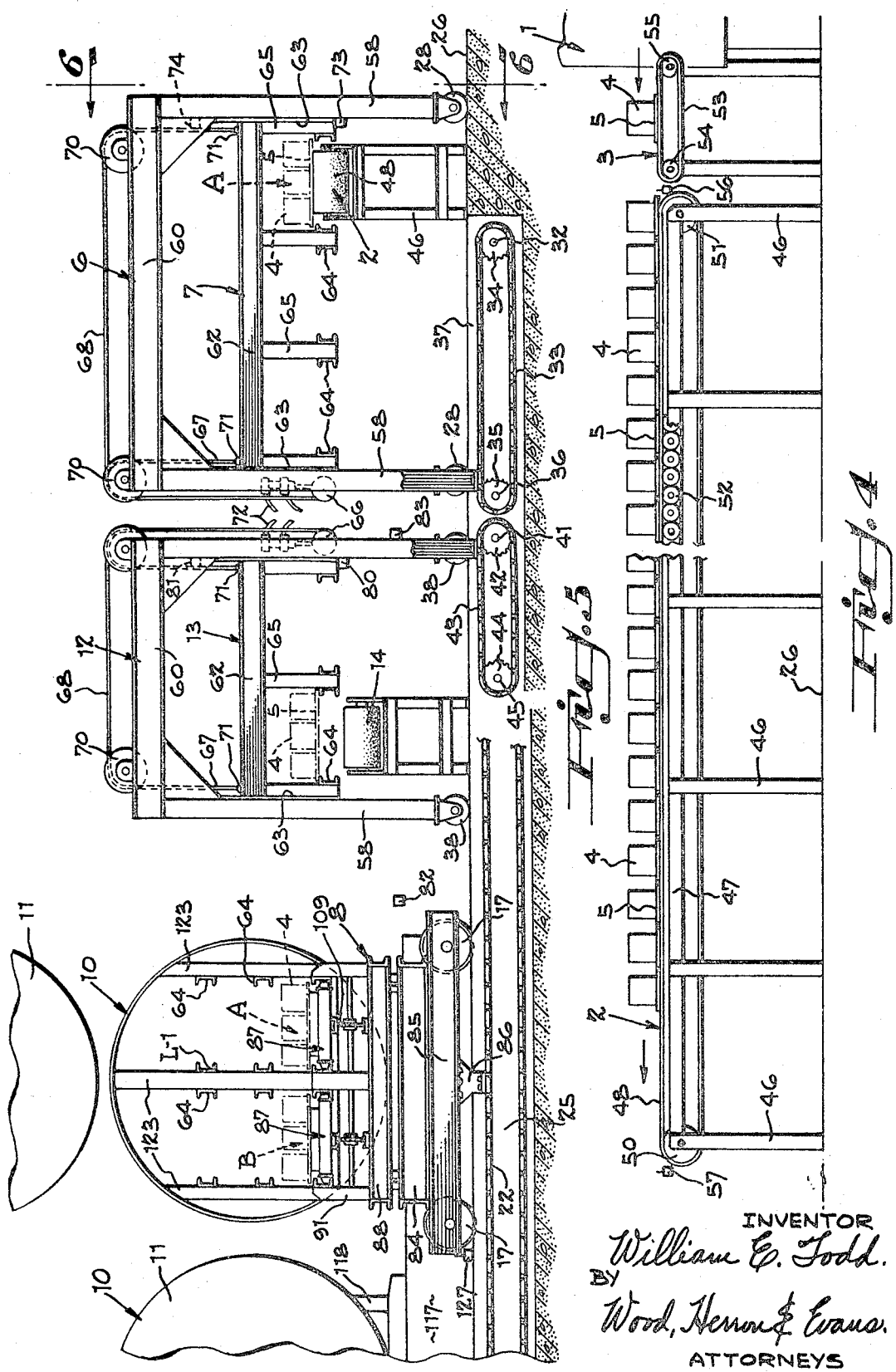

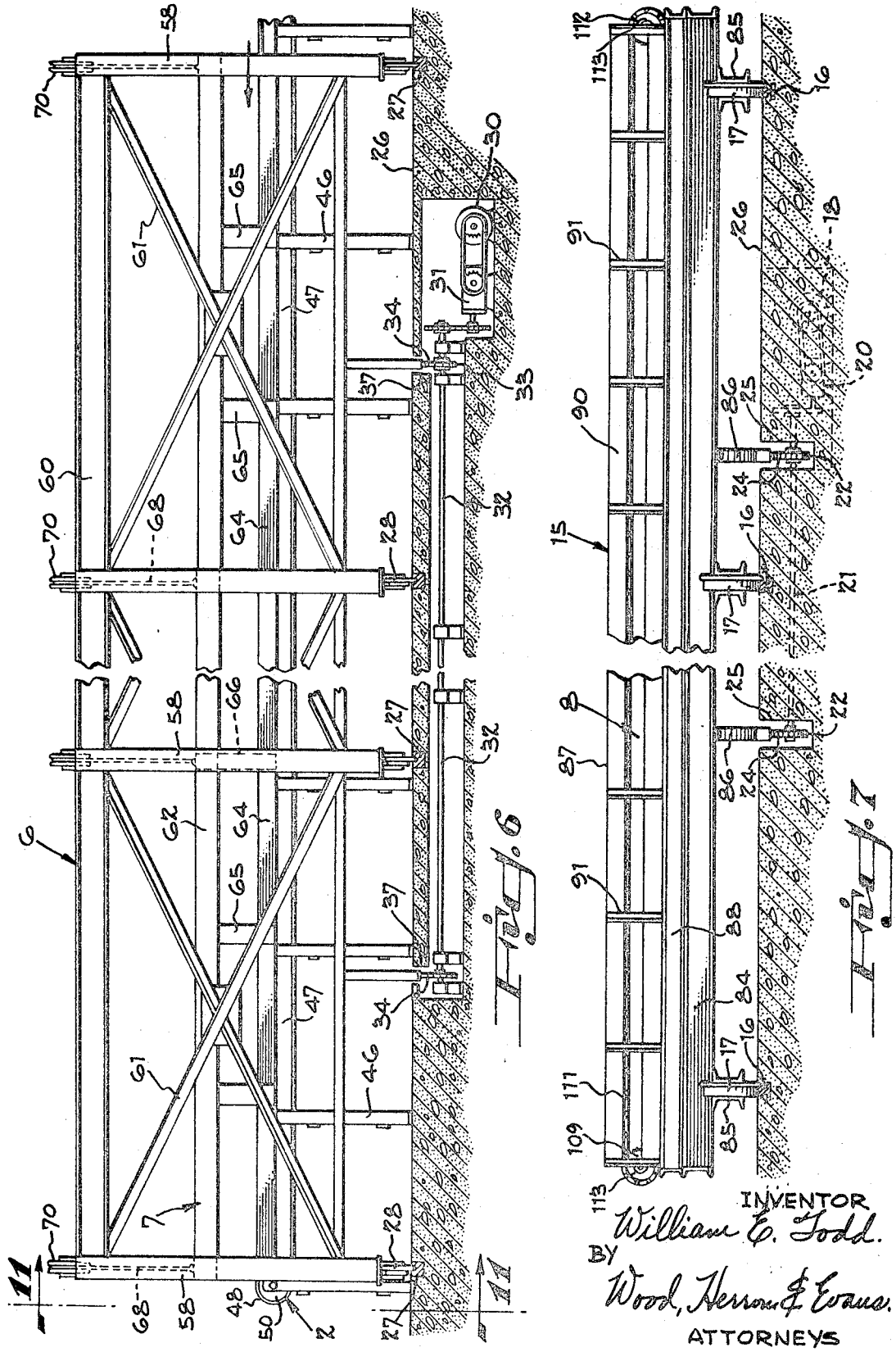

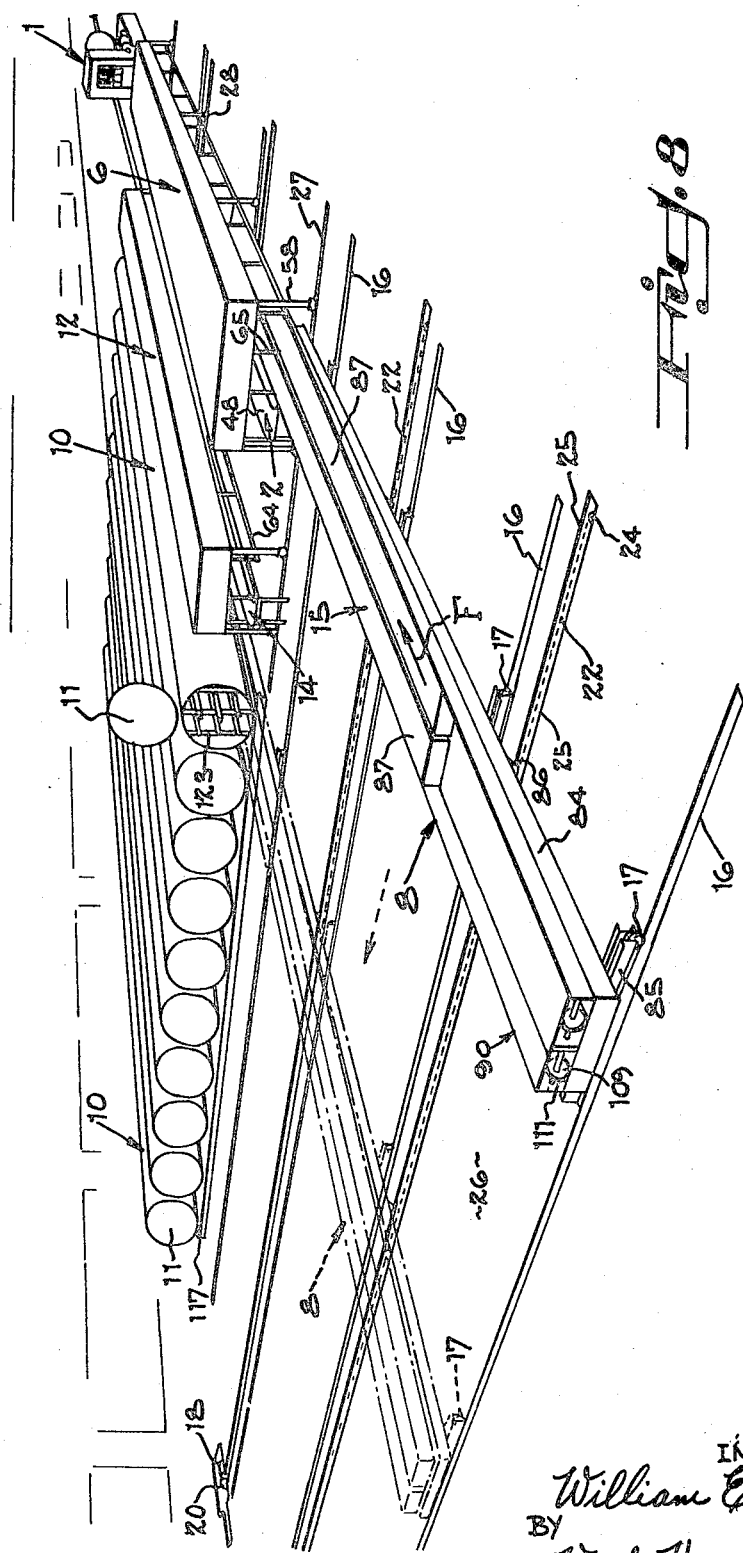

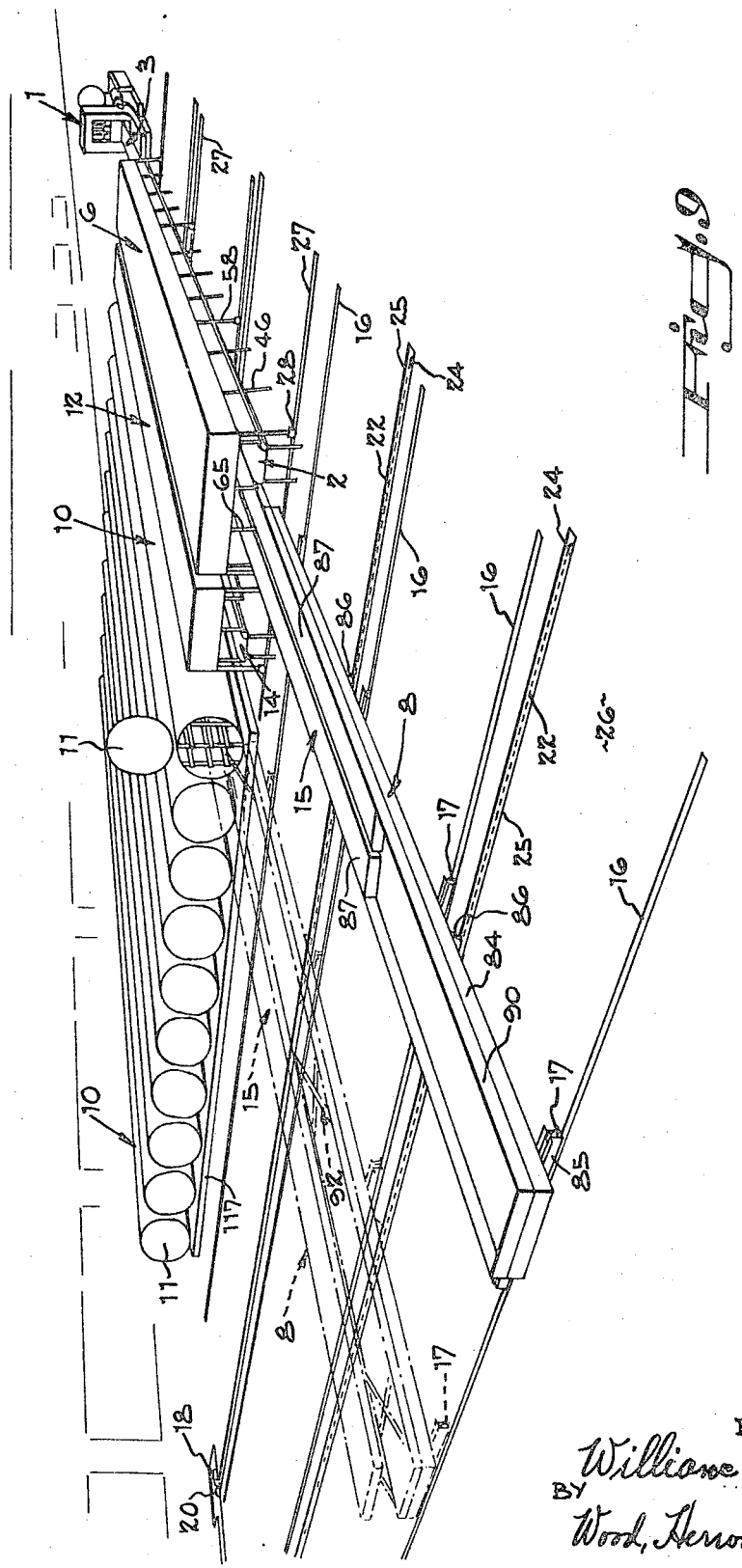

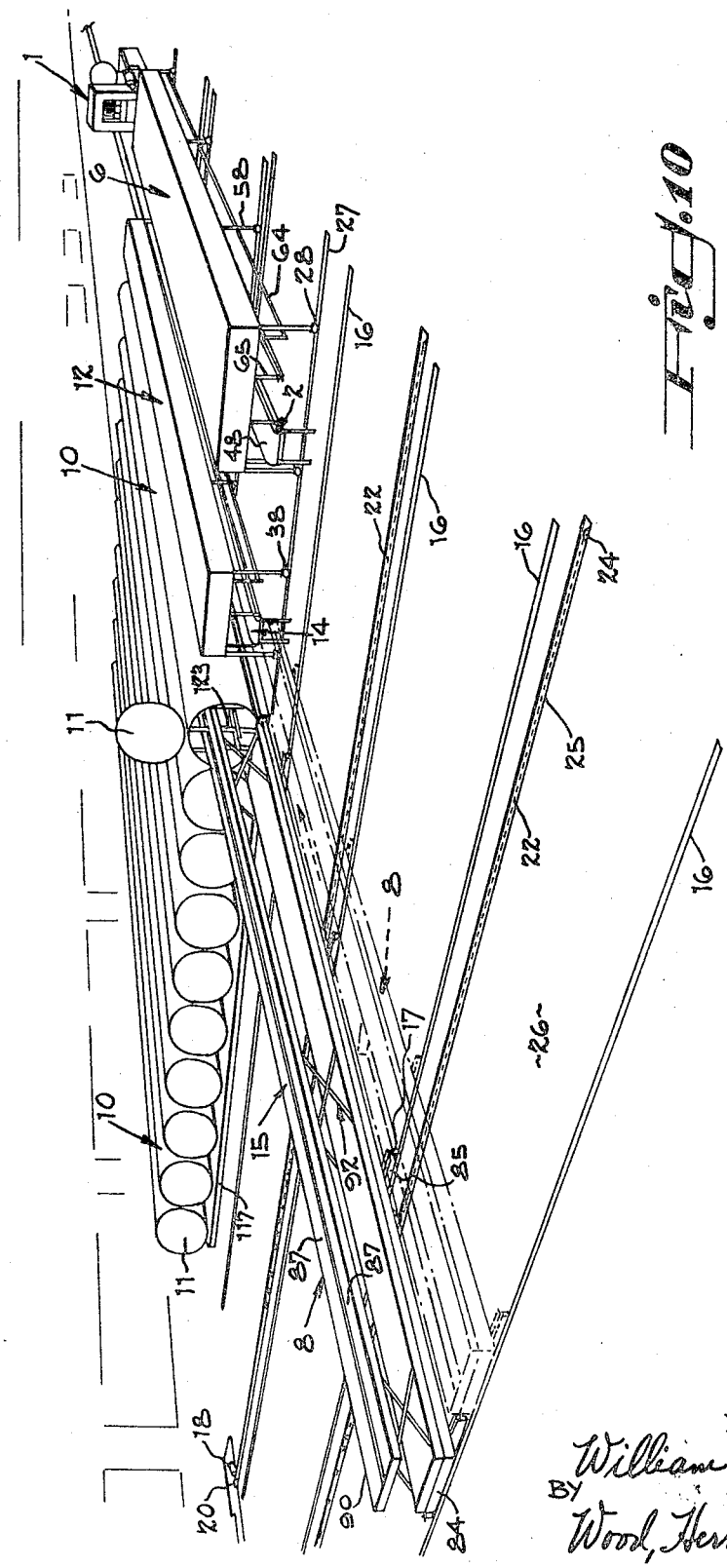

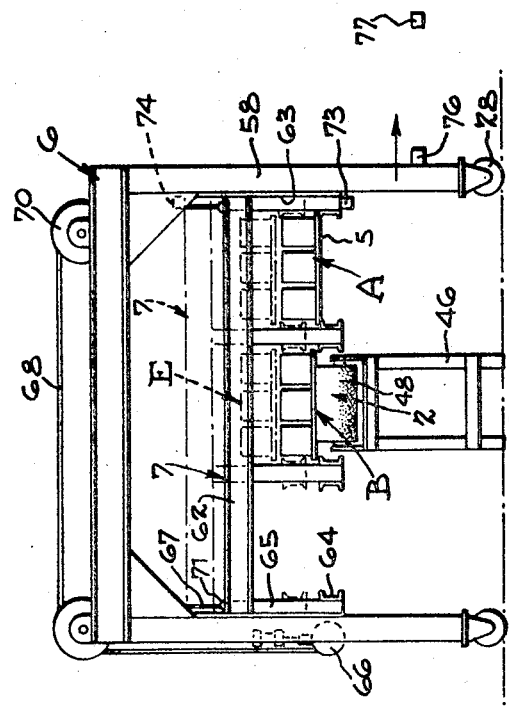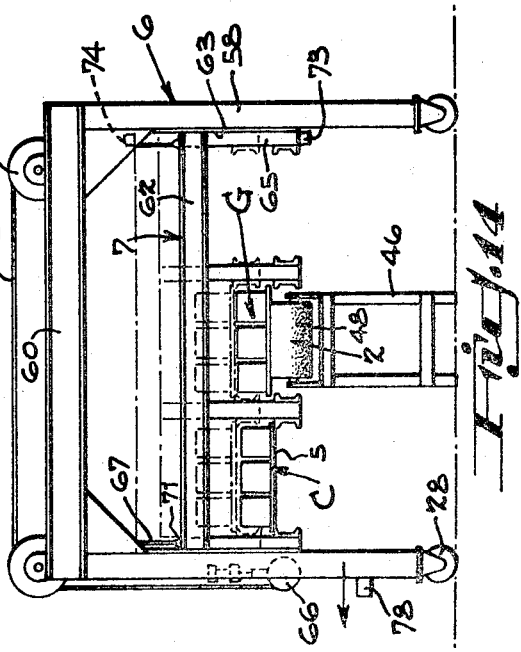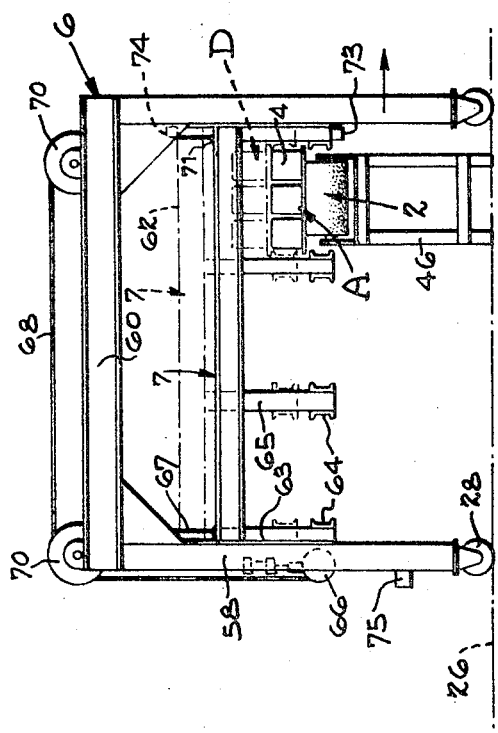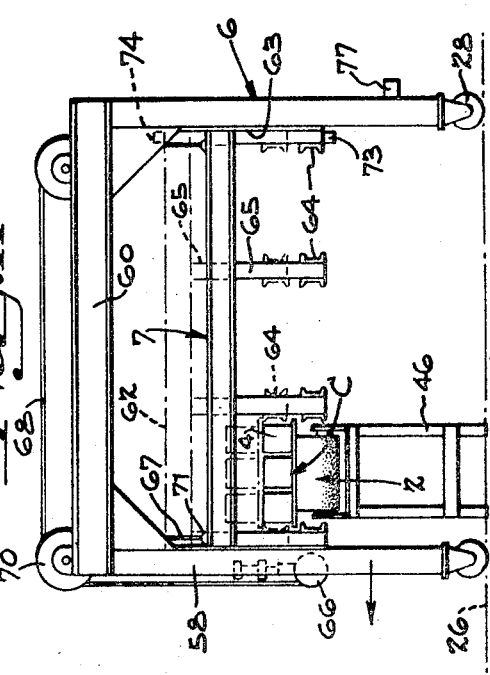

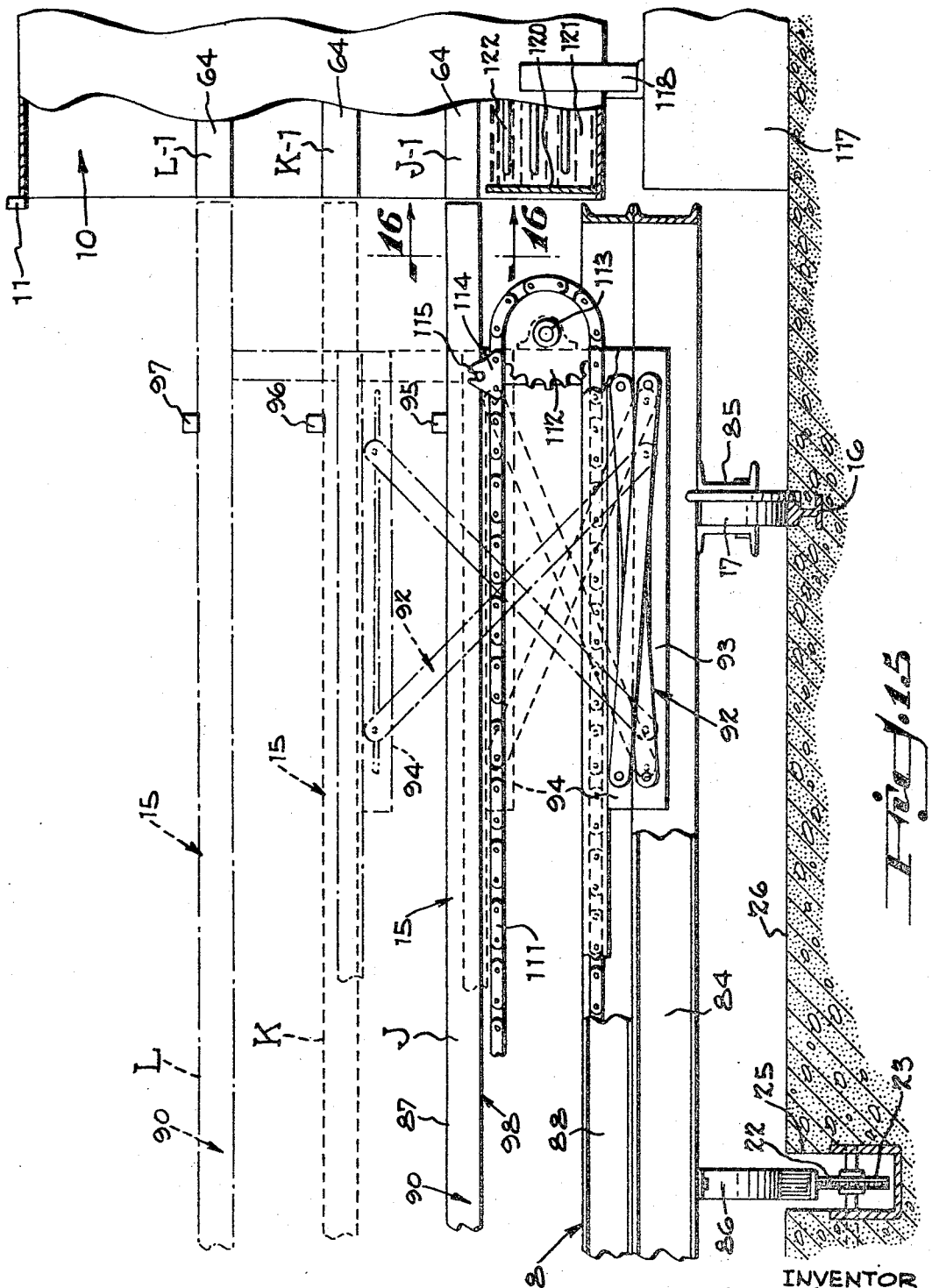

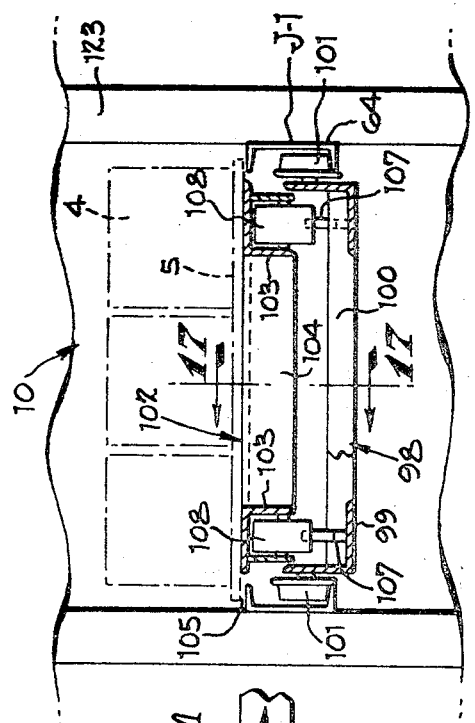
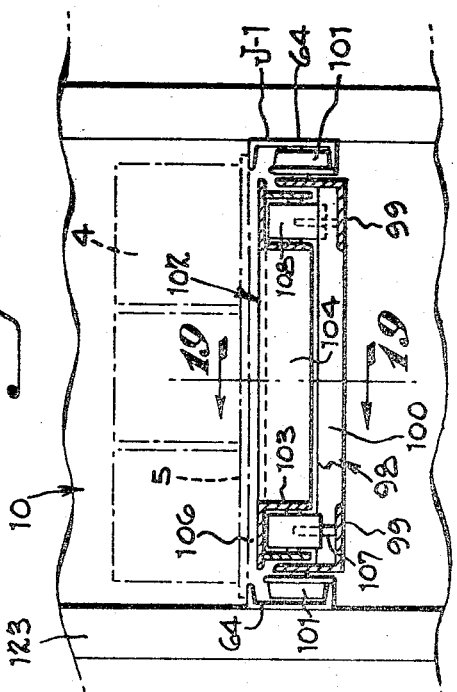
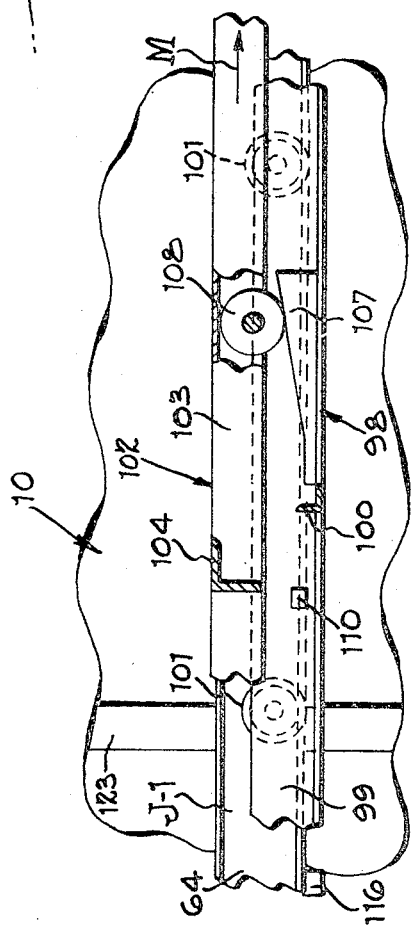
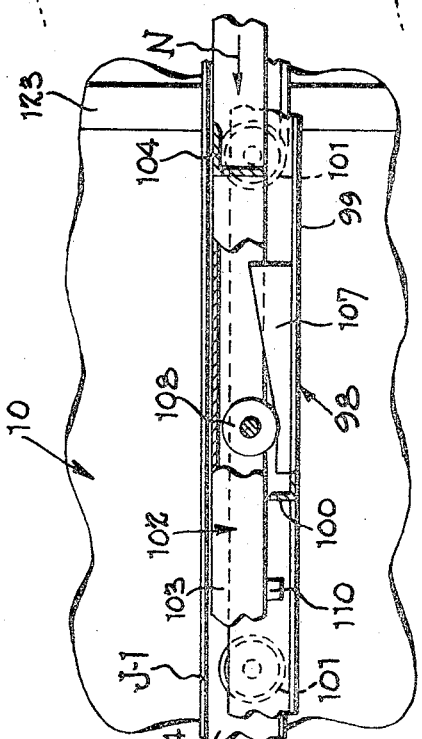

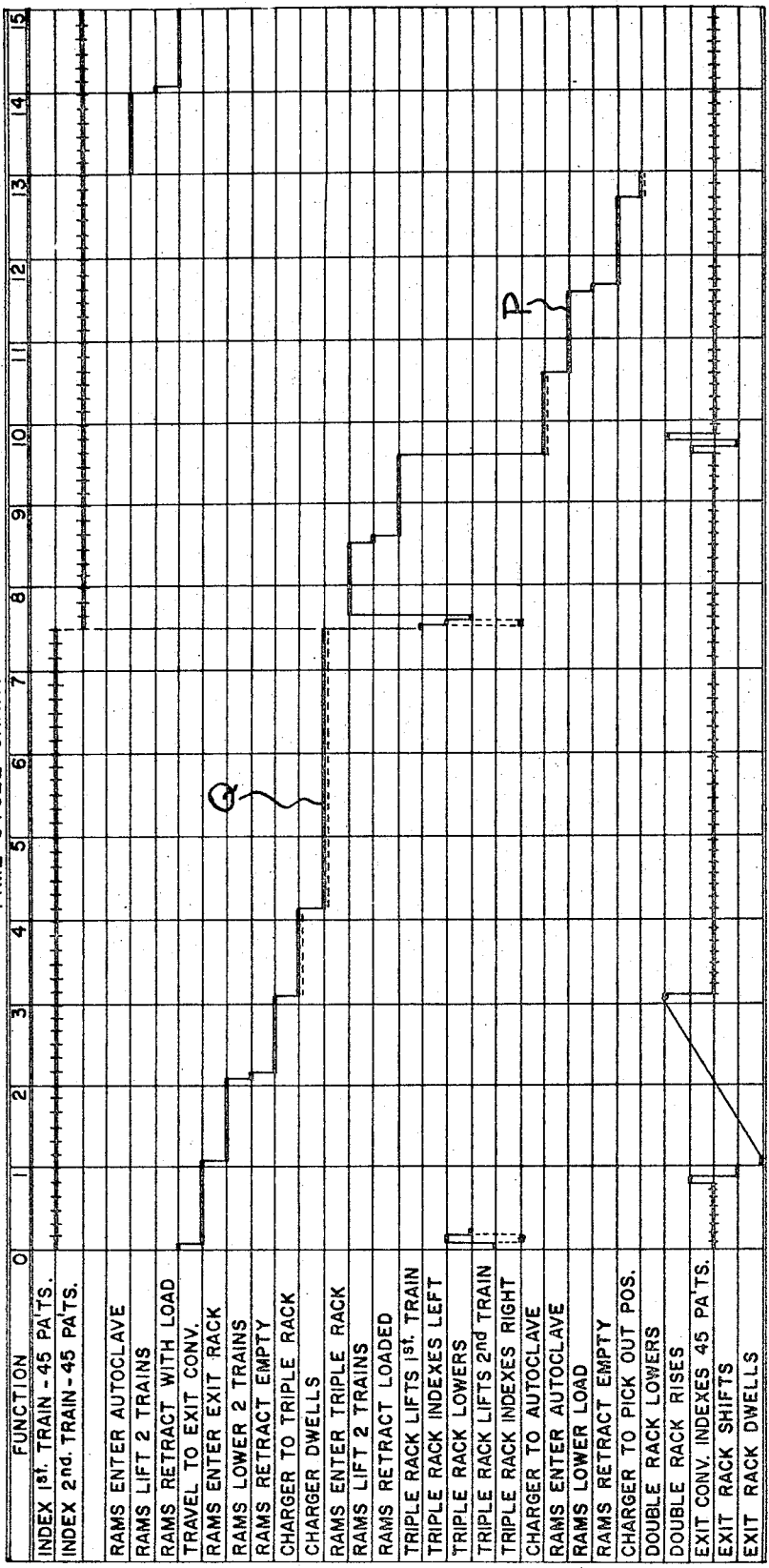

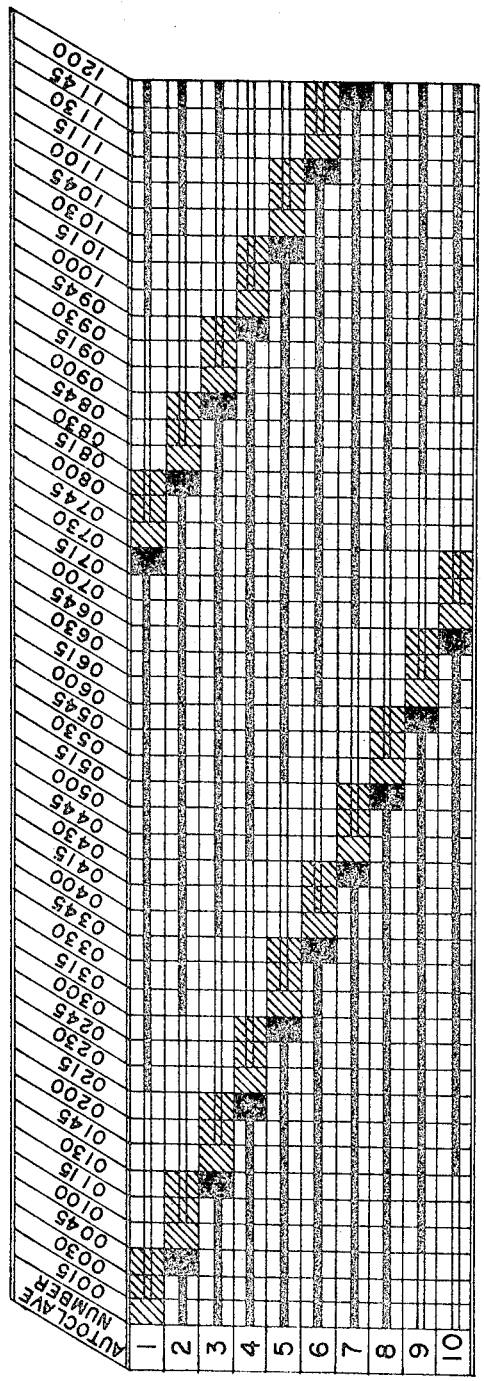

TRANSFER MECHANISM FOR BLOCK HANDLING APPARATUS

This application is a division of my copending application Ser. No. 568,683, filed Jul. 28, 1966, which has matured into U.S. Pat. No. 3,412,878.

This invention relates to an apparatus or system for handling building blocks and other articles of this nature which are subjected to a treatment or curing period after having been initially produced by a forming press.

One of the primary objectives of the invention has been to provide a completely automatic block handling system which is simple in construction and which provides reliable high speed operation at a continuous rate.

Generally speaking, the apparatus of this invention coacts with a block forming machine which produces palletized, uncured blocks continuously at a given rate for transfer to the block treating section of the apparatus. In the present example selected to illustrate the principles of the invention, the treating section comprises a series of curing chambers or autoclaves which cure the blocks in an atmosphere of heat and pressure. The present handling apparatus may also be arranged to deliver the uncured blocks upon pallets to a continuous treatment tunnel or to a storage area in place of the autoclaves which have been selected for illustration.

Another objective of the invention has been to provide an automatic block handling apparatus in which the several components of the apparatus operate in a predetermined sequence in time with the operations of the block forming machine, the arrangement being such that the uncured blocks, resting upon pallets, are advanced in the form of two parallel trains from the forming machine, and are transferred to a plurality of tiers or racks within each autoclave in a predetermined order. The trains of loaded pallets are removed from the autoclave after a predetermined number of treatment hours in any given autoclave.

In the preferred example, as disclosed herein, the autoclaves are charged in a scheduled sequence, preferably in consecutive order, the first charge (two trains) being placed on the top tier or level in the autoclave, the second charge on the center tier, and the third charge on the lower tier. By virtue of this schedule, the blocks in the first-charged autoclave are cured by the time the last autoclave of the series is charged, such that the cured blocks may be retrieved from the first-charged autoclave and discharged from the system after the last consecutive autoclave has been charged. This cycle may be repeated continuously along the line of autoclaves so as to operate the apparatus on a continuous 24 hour schedule during which time the autoclaves are continuously charged and discharged in sequence. As noted above, the same handling apparatus may be utilized in charging a single, continuous treatment tunnel or a storage area; in any event, the blocks are advanced continuously from the forming machine and handled in the same manner.

A further objective of the invention has been to provide a block handling apparatus having improved components coacting with one another, and in which the components include pairs of identical channel rails for supporting the trains of pallets during the several transfer, curing, and discharging operations, the blocks remaining upon the same pallets throughout the several handling operations.

According to this aspect of the invention, the handling apparatus comprises an accumulating conveyor which receives the pallets of freshly formed blocks from the forming machine and which reforms the pallets into continuous trains. A transfer mechanism, which cooperates with the accumulating conveyor, includes a lift frame having three racks (pairs of channel rails) extending parallel with the conveyor and arranged to shift bodily relative to the conveyor and to lift the completed trains from the conveyor, such that two trains of pallets are stored temporarily by the transfer mechanism to be picked up by a charging mechanism.

The charging mechanism is arranged to shuttle bodily between the transfer mechanism and autoclaves so as to convey the two trains of loaded pallets from the transfer mechanism to a selected autoclave or storage point. For this purpose, the charging mechanism includes a longitudinally extensible ram arranged to pick up the two trains of loaded pallets from the channel rails of the transfer mechanism and to transfer the two trains to the channel rails of a selected autoclave of the series. The charging ram aligns itself vertically and horizontally with the channel rails of the autoclave during the charging operation. The ram also retrieves the cured blocks from the autoclaves and transfers them to an exit mechanism, as described later.

According to the present disclosure, the block forming machine operates continuously and the blocks are advanced in single train formation on the accumulating conveyor. After the charging ram has removed two parallel trains for transfer to the autoclaves, the transfer mechanism accumulates a third train in a third lane, then the transfer mechanism shifts in the reverse direction and starts to accumulate in the center lane, which has just been vacated. The transfer mechanism then shifts to a position displaced laterally from the accumulating conveyor to be able to start accumulating a fourth train of pallets, thus making up the second train. Thus, two new parallel trains of loaded pallets will have been accumulated and temporarily stored on the channel rails of the triple rack transfer mechanism, ready to be picked up by the charging ram upon its return shuttle motion back to the transfer mechanism.

The use of channel rails for the triple racks of the transfer mechanism, autoclaves, and discharge mechanism is of particular advantage since the charging ram, which is extended longitudinally into the transfer mechanism, into the autoclaves, and into the discharge mechanism, requires support. Accordingly, the ram includes regularly spaced rollers which ride upon the lower flanges of the channel rails, the upper flanges being utilized to support the loaded pallets.

In making a transfer, for example, from two of the racks of the triple rack transfer mechanism, the rollers of the extending ram ride upon the lower flanges, with the upper portion of the ram in a lowered position. Upon being fully inserted, the upper portion of the ram is elevated (while the rollers remain in tracking engagement with the lower flanges) so as to elevate the train of pallets from the upper flanges, then the ram is retracted, carrying the two trains of loaded pallets from the transfer mechanism.

Upon reaching a selected autoclave, the same operation takes place in reverse order, that is, the ram enters the selected sets of channel rails in an autoclave with its upper portion elevated, (with the pallets elevated above the rails) and with the rollers tracking upon the lower flanges of the channel rails. Upon being fully inserted, the upper portion of the ram is lowered, thereby to deposit the two trains of pallets upon the upper flanges of the channel rails. The ram is then retracted for further operations.

The discharge or exit mechanism is generally similar to the transfer mechanism and includes a lift frame or rack having two pairs of channel rails. The discharge mechanism includes an exit conveyor which discharges the loaded pallets of cured blocks in single train formation. After the charging ram retrieves two parallel trains of cured blocks from one of the autoclaves, it shuttles to the exit mechanism and by a combination of horizontal and vertical movements, aligns the ram with the pairs of channel rails of the discharge mechanism, then places the pallets upon the rails, in the manner described above. The discharge mechanism (lift frame) sequentially lowers a first train upon the exit conveyor; after the first train is discharged, the discharge mechanism is shifted to place the second train upon the exit conveyor to be discharged.

The various features and advantages of the invention will be more clearly apparent to those skilled in the art from the following detailed description taken in conjunction with the drawings.

In the drawings:

FIG. 1 is a perspective view showing one portion of the handling apparatus as viewed from the charging machine runway area of the apparatus.

FIG. 2 is a perspective view forming a continuation of FIG. 1, illustrating the autoclave section of the apparatus.

FIG. 3 is a diagrammatic top plan view of the block handling apparatus, showing, in a general way, the relationship of the several components.

FIG. 4 is a side elevation of the apparatus, as viewed along the line 4—4 of FIG. 3, illustrating the accumulating conveyor which stores the blocks temporarily as they issue from the block forming machine.

FIG. 5 is an end elevation view taken along line 5—5 of FIG. 3, illustrating in general, the relationship of the transfer mechanism which receives the blocks from the accumulating belt conveyor, the exit mechanism which discharges the cured blocks, and the charging mechanism which transfers the raw building blocks from the block forming machine to a selected autoclave of the series.

FIG. 6 is a side elevation, as viewed along the line 6—6 of FIG. 5, further illustrating the transfer mechanism.

FIG. 7 is a side elevation, partially in section, as viewed along the line 7—7 of FIG. 3, further illustrating the charging mechanism which transports the raw blocks from the accumulating conveyor and transfer mechanism to one of the selected autoclaves.

FIG. 8 is a diagrammatic perspective view of the apparatus, showing, in full lines the charging mechanism in alignment with the transfer mechanism in a position to engage and withdraw the pallets of raw blocks for transfer to a selected autoclave.

FIG. 9 is a diagrammatic perspective view similar to FIG. 8, showing the charging mechanism in a second pickup position with reference to the transfer mechanism of the accumulating conveyor.

FIG. 10 is a diagrammatic perspective view similar to FIGS. 8 and 9, showing the charging mechanism shifted from the transfer mechanism to one of the autoclaves, in a position to transfer the loaded pallets of raw blocks to one of the autoclaves of the series.

FIG. 11 is an end view of the accumulating conveyor taken along the line 11—11 of FIG. 6.

FIG. 12 is an end view similar to FIG. 11, showing the block transfer mechanism in a second position with reference to the accumulating conveyor.

FIG. 13 is an end view similar to FIG. 11, showing a third position of the transfer rack mechanism.

FIG. 14 shows the transfer rack mechanism in a fourth position with reference to the accumulating conveyor.

FIG. 15 is an enlarged fragmentary side elevation of the charging mechanism, generally similar to FIG. 7, showing the ram aligned with one set of channel rails of the autoclave.

FIG. 16 is a fragmentary sectional view taken along line 16—16 of FIG. 15, further illustrating the ram of the charging mechanism which transfers the freshly formed blocks into the autoclave.

FIG. 17 is a fragmentary sectional view taken along line 17—17 of FIG. 16, showing the ram of the charging mechanism in an elevated position for transferring the pallets of freshly formed blocks to the top surface of the channel rails within the autoclave.

FIG. 18 is a sectional view, generally similar to FIG. 16, showing the ram in its lowered position, with the pallets of freshly formed blocks deposited upon the upper surface of the channel rails within the autoclave.

FIG. 19 is a fragmentary side view taken along line 19—19 of FIG. 18, showing the ram in its lowered position for depositing the pallets upon the channel rails of the autoclave, as shown in FIG. 18.

FIG. 20 illustrates a chart showing the time cycle of operation.

FIG. 21 illustrates a chart showing a typical 12-hour operating cycle with respect to the loading and unloading of the 10 autoclaves which are illustrated in the present example of the invention.

GENERAL ARRANGEMENT

Described generally with reference to FIGS. 1 and 2, the block handling apparatus which has been selected to illustrate the principles of the invention, includes a block forming machine of conventional design, which is indicated generally at 1. An accumulating conveyor, of the indexing belt type, is indicated generally at 2, and a runout conveyor 3 (FIGS. 1 and 4), advances the raw, freshly formed blocks from the forming or molding machine 1 to the accumulating conveyor 2.

The blocks, which are indicated at 4 (FIGS. 4 and 5), are formed in groups of three upon each operating cycle of the block forming machine 1, each crossrow of three blocks being deposited upon an individual pallet 5. The freshly formed raw blocks remain upon the pallets 5 throughout the handling and curing sequence.

As each loaded pallet is deposited upon the accumulating conveyor 2, the belt is advanced one indexing step, the advancement being slightly greater than the dimension of the pallet in the direction of its advance, such that a clearance space exists between the successive pallets on the accumulating conveyor 2 (FIG. 4). In the present example, this operation continues until the upper run of the belt conveyor 2 has accumulated a train of 45-spaced loaded pallets. At this point, the loaded pallets collectively are transferred from the accumulating conveyor 2 by a shiftable three-position or triple rack transfer mechanism, indicated generally at 6 (FIGS. 1, 3 and 5). The operation of the transfer mechanism 6 is described in detail later.

The transfer mechanism 6 extends in parallelism with the accumulating conveyor 2 and includes a triple rack lift frame 7 arranged to accumulate three trains of loaded pallets, as explained later. Briefly, the transfer mechanism 6 is adapted to transfer the trains of loaded pallets from the accumulating conveyor 2 by a combination of vertical movements (lift frame 7) combined with horizontal movements of the transfer mechanism. The pallet trains are transported from the transfer mechanism by an autoclave charging mechanism, indicated generally at 8 (FIGS. 1–3).

The charging mechanism 8 is arranged to shuttle between the transfer mechanism 6, between the autoclaves 10, and from the autoclaves to the exit mechanism 12. Upon reaching a selected autoclave, the charging mechanism 8 is stopped in alignment with the open end of the autoclave to charge two trains of loaded pallets of raw blocks and also, at least in some instances, to remove two trains of cured blocks from the autoclave. For this purpose, the charging mechanism 8 is provided with a charging and retrieving ram 15 in the form of two parallel sections, as explained later, which is extended longitudinally into the autoclave for charging and is retracted to retrieve the cured blocks.

In the present example, each autoclave 10 is provided with tiers of pallet support channel rails, as explained later, and each autoclave is provided with a vertically shiftable door 11 which is opened to admit the ram 15 and is closed after the block charging and retrieving operation is completed.

After the trains of cured blocks are retrieved from the autoclave, the charging mechanism 8 shuttles to a two-position exit mechanism, indicated generally at 12 (FIG. 5). The exit mechanism 12 includes a vertically shiftable double rack lift frame 13, generally similar to the lift frame 7 of the transfer mechanism 6. The ram 15 of the charging mechanism 8 is arranged to extend itself longitudinally and deposit two cured trains of blocks upon the lift frame 13 of the exit mechanism 12.

The exit mechanism 12 extends longitudinally in parallelism with an exit conveyor 14 of the belt type, which is arranged to discharge the trains of loaded pallets from the apparatus in single line formation. The single lines of trains are deposited upon the exit conveyor 14 by a combination of horizontal movements of the exit mechanism 12 combined with vertical movements of the lift frame 13, in a manner generally similar to the operation of the transfer mechanism 6, but in reverse order.

As described later in detail, the autoclave charging mechanism 8 (FIGS. 1–3 and 5) is carried upon three tracks 16 which extend parallel with the receiving ends of the autoclaves 10 and the delivery and receiving ends of the transfer mechanism 6 and the exit mechanism 12. The frame of the charging mechanism 8 includes sets of flanged wheels 17, riding upon the tracks 16. The charging mechanism 8 is thus carried in an accurate path along the ends of the autoclaves and along the ends of the transfer and exit mechanisms and is stopped accurately in its selected positions by means of limit switches which are associated with the several components, as explained later.

Motive power is supplied to the charging mechanism 8 to impart the shuttle motions to the selected stations by an electric motor 18 (FIGS. 2, 3 and 7) driving a reduction gearbox 20. The gearbox 20 is in driving connection with a cross-shaft 21 which is in driving connection with a pair of chain loops 22–22. The chain loops 22 pass around drive sprockets 23 on shaft 21 and about idler sprockets 24–24 at the opposite ends of the chains 22. It will be noted in FIG. 7, that the tracks 16, the power motor 18, the transport chains 22 and other components of the driving mechanism are located within slots 25 formed in the floor 26 of the plant. The motor 18 preferably is of a type arranged to stop the charging mechanism 8 in accurate alignment at its several stations upon being deenergized by the limit switches of the control system, as explained later.

As noted above, the three-position, triple rack transfer mechanism 6 is arranged to be shifted in parallelism with the accumulating conveyor 2. For this purpose (FIGS. 3, 5 and 8), there is provided a pair of tracks 27–27 parallel with the tracks 16, previously described, the frame of the transfer mechanism having sets of wheels 28 riding upon the tracks 27.

In order to shift the transfer mechanism 6 to its three positions, there is provided an electric motor 30 (FIGS. 3, 5 and 6) in driving connection with a reduction gearbox 31. Gearbox 31 is in driving connection with a shaft 32 which includes two chain loops 33–33 connected to the transfer mechanism 6. The chain runs 33 pass about a pair of driving sprockets 34 carried on drive shaft 32, and about idler sprockets 35 carried upon an idler shaft 36. As noted with respect to the charging mechanism, the driving system for the transfer mechanism 6 is located in a slot 37 formed in the floor 26. The motor 30 of the transfer rack is of a type arranged to stop the transfer mechanism in accurate alignment in its three positions relative to conveyor 2 upon being deenergized by the limit switches of the control system.

The two-position, double rack exit mechanism 12 is arranged to be shifted in parallelism with the exit conveyor 14, so as to deposit the two cured trains of pallets in single line formation upon the exit conveyor 14, as noted earlier. For this purpose, as shown in FIGS. 3 and 5, the exit mechanism 12 is provided with sets of wheels 38, riding upon the tracks 27 which extend beyond the transfer mechanism 6 to accommodate the exit mechanism 12.

In order to shift the exit mechanism 12 to its two positions in parallelism with the exit conveyor 14, there is provided an electric motor, shown diagrammatically at 40 in FIG. 3. The exit motor 40 drives a gearbox (not shown), similar to the gearbox 31 of the transfer mechanism, as indicated in FIG. 3. The motor 40 is in driving connection with a drive shaft 41 having drive sprockets 42–42 driving a pair of chain loops 43–43, which are connected to the exit mechanism 12. The opposite ends of the chain runs 43 pass about idler sprockets 44–44 mounted upon an idler shaft 45 (FIG. 5).

The driving system of the transfer mechanism is located in the same slot 37 which houses the driving system of the accumulating mechanism, the two chain runs 33 and 43 being disposed in alignment with one another. The motor 40 of the exit mechanism 12 is also of a type arranged to stop the exit mechanism on accurate alignment in its two positions relative to the exit conveyor so as to deposit the two trains of pallets individually in line formation upon the exit conveyor 14.

OPERATION

As noted above, the several shiftable components of the machine operate in synchronism with one another in transferring the trains of loaded pallets from the block forming machine 1 to a selected one of the series of autoclaves 10. After a predetermined treatment period in a given autoclave, the trains of pallets, supporting the treated blocks, are removed from the autoclave then transported to the exit conveyor mechanism 12 for discharge from the machine.

Speaking generally, the movements of the block handling components, that is, the transfer cycle, are initiated as the predetermined number of pallets, in train formation, are advanced from the forming machine 1 and accumulated on the conveyor 2. In the present example, the movements of the several components are controlled by limit switches which are interconnected in an electrical control system; however, reference to the limit switches has been omitted at this point for the sake of simplicity.

According to the present example, the accumulating conveyor 2 (FIG. 4) is arranged to receive the loaded pallets 5 from the forming machine 1 at the rate of six pallets per minute, the accumulating belt conveyor 2 being advanced in step-wise fashion as each loaded pallet is deposited upon the leading or receiving end of the conveyor 2. The belt conveyor 2 is arranged to accumulate, in the present example, a total of 45 loaded pallets, with three freshly formed blocks 4 positioned in a crossrow upon each pallet.

When the 45th pallet is deposited upon the pallet conveyor 2, a transfer cycle is initiated (transfer mechanism 6 θ FIGS. 5 and 11–14). In this description the first train of pallets is indicated at A; the second train, which is subsequently accumulated, is indicated at B; and a third train is indicated at C. These three trains are referred to in this description in order to disclose the operation in a simplified manner. Upon initiation of the transfer cycle, the lift frame 7 of transfer mechanism 6, which includes channel rails straddling the conveyor 2, is elevated so as to lift the train A of loaded pallets from the conveyor 2 (FIG. 11) so as to elevate the pallets from the position A (resting upon conveyor 2), to the elevated position D shown in broken lines.

After the lift frame 7 is elevated above conveyor 2, (train A - FIG. 11) the transfer mechanism 6 is shifted transversely to the position of FIG. 12, as indicated by the arrow. Thereafter the lift frame is lowered so that its second pair of rails are disposed in a position straddling the belt conveyor 2 in order subsequently to lift the next train B of 45 pallets from the belt conveyor 2. After the second train of pallets B has been accumulated, the lift frame 7 is again elevated so as to lift the train B from the conveyor 2 to the position indicated at E in FIG. 12.

After the second train B is removed, the transfer mechanism 6 shifts from its second position (FIG. 12) to its third position, as indicated in FIG. 13, then the lift frame 7 is lowered to cause its third set of rails to straddle conveyor 2. At this point the block machine begins to load the conveyor 2 with the third row of blocks C.

While the third train of pallets C is being accumulated on conveyor 2 (FIG. 13), the autoclave charging mechanism 8 will have shifted transversely into alignment with the trains of pallets A and B which are now resting upon the first two pairs of rails of the lift frame 7, in order to transfer the rows A and B to one of the selected autoclaves. For this purpose, the ram 15 (FIG. 8) is shifted longitudinally, as indicated by the arrow F to a position beneath the trains of pallets A and B resting upon the rails of the lift frame 7. After the ram 15 is inserted, it is shifted upwardly to lift the trains of pallets A and B from the rails of the lift frame 7, then the ram 15, in its elevated plane, and with the trains A and B resting upon it, is retracted longitudinally to withdraw the trains A and B.

After ram 15 with trains A and B has been retracted, the charging mechanism 8 is shifted from the transfer mechanism 7 to a position adjacent a selected autoclave or curing chamber 10, as indicated in FIG. 5 and in broken lines in FIG.

8. Upon arriving at the autoclave, the door 11 will be opened in accordance with the schedule illustrated in the time cycle chart shown in FIG. 20, as explained later in detail. At this point the ram 15 is elevated to a plane slightly above one of the sets of channel rails of the autoclave and is then extended to shift the trains A and B (one charge) into the autoclave. The ram 15 is then lowered to deposit the trains A and B upon the autoclave rails; thereafter the ram is retracted.

At this point, the ram is shifted to a different elevation (FIG. 9) and the charging ram 15 again enters the autoclave below a different pair of trains of treated blocks which have previously been charged into the autoclaves. It is to be understood that the ram may enter the same autoclave or an adjacent one depending upon the curing schedule. At any rate, the ram is elevated sufficiently to lift the two cured trains of pallets (one charge) from the rails, then the ram retracts to withdraw the two trains, then the door 11 is closed.

After the withdrawal of ram 15 (FIG. 10) the charging mechanism 8, supporting the two trains of pallets, shifts into alignment with the exit mechanism 12 as shown in broken lines (FIG. 10), so as to discharge the two treated trains from the apparatus. As noted earlier, the exit mechanism includes the vertically shiftable lift frame 13 which operates with reference to the discharge conveyor 14.

In order to discharge the two trains individually, the lift frame 13 of the exit mechanism 12 is elevated with reference to the discharge conveyor 14. The lift frame 13 includes pallet support channel rails similar to the pallet support rails of the lift frame 7 (transfer mechanism 6). With the lift frame 13 elevated, the ram 15 of charging mechanism 8 is elevated to a plane slightly higher than the rails of lift frame 13, then the ram is extended into the exit mechanism 12 and lowered to deposit the two trains upon the rails of the lift frame. The ram 15 then retracts, with the two trains resting upon the rails of the lift frame 13.

The exit mechanism 12, as noted, serves a single exit conveyor 14, the arrangement being such that the two trains of pallets are placed individually upon the exit conveyor 14 in line formation. In order to carry out this operation, the two-position lift frame 13 operates in a manner similar to lift frame 7 of the transfer mechanism 6, except in reverse order.

With the two trains supported by the rails of the lift frame, the lift frame 13 is lowered so as to deposit the first train upon the exit conveyor 14 for discharge from the machine. After the first train is discharged, the lift frame 13 is again elevated, then the exit mechanism 12 is shifted bodily in parallelism with conveyor 14 to align the second train with conveyor 14. The lift frame is then lowered below the plane of the conveyor 14 so as to deposit the second train upon the conveyor. The lift frame remains in its lowered position until the second train is discharged, then the lift frame 13 is elevated and the exit mechanism 12 shifts back to its first position with the lift frame in its elevated position, ready to receive the next two trains for discharge.

As the trains of pallets discharge from the apparatus they reach a separating mechanism (not shown) where the blocks are separated from the pallets. As this point the pallets are returned to the block forming machine for reuse by a suitable conveyor mechanism (not shown) and the blocks may be advanced by another conveyor to a finishing machine, if necessary, or they may be transported from the apparatus for storage or transportation to the user.

While the above-described operations are being carried out, the next two trains of pallets C and G will have been accumulated on the rails of the transfer mechanism (FIG. 14). These trains subsequently transferred to the autoclaves by the ram 15, which is shown entering the transfer mechanism (FIG. 9) to withdraw trains C and G.

ACCUMULATING CONVEYOR

The accumulating conveyor (FIG. 4) essentially comprises a frame formed of structural members having a series of vertical supports or standards 46 resting upon the floor 26 of the building, with horizontal framing members 47—47 secured to the upper end portions of the vertical standards 46. The belt 48 of conveyor 2 passes around a drive pulley 50 at the outer end of the frame and the opposite end of the belt run passes about an idler pulley 51 adjacent the runout conveyor 3. The pulleys 50 and 51 are journaled in the frame in the usual manner and the drive pulley 50 is connected to a variable speed motor (not shown). The upper run of belt 48, which carries the weightload, is supported by a series of idler rollers 52 journaled between the longitudinal framing members 47.

The apparatus, that is the runout conveyor 3 and the accumulating conveyor 2, are interlocked with one another to prevent interference in the event that the first pallet of the trains interfere with one another. In other words, the runout conveyor 3 is idled momentarily while the transfer motion is carried out; upon return of the transfer mechanism, the runout conveyor is again activated to transfer or advance the delayed pallet to the pickup end of the accumulating conveyor. This action naturally alters the time between the first pallet entering the accumulating conveyor and the second pallet, due to time delay. For example, pallets are ejected normally every 10 seconds; however, if a pallet is held on the runout conveyor temporarily, it may cut the time in half. Hence, the time between the first and second pallet may be reduced to 5 seconds rather than the normal 10 seconds.

The runout conveyor 3, is also the belt type and forms a part of the block forming machine 1. The downstream end of belt run 53 of conveyor 3 passes about a drive pulley 54 and the opposite end of the belt run passes about an idler pulley 55. A conveyor motor (not shown) is in driving connection with the drive pulley 54 to advance the pulley in step-wise fashion each time a loaded pallet 5 is placed upon the runout conveyor by the block making machine 1.

A vane-type limit switch, indicated diagrammatically at 56, is located at the upstream end of runout belt 53 and is triggered by the loaded pallet 5 which is advanced upon the belt 53. A second vane-type limit switch, shown diagrammatically at 57, is mounted at the downstream end of the accumulating conveyor 2.

As each pallet is advanced by the runout conveyor 3, its leading edge trips the arm of the limit switch 56. The limit switch 56 energizes the motor of the accumulating conveyor 3 so as to advance the conveyor 3 through one step, sufficient to receive the loaded pallet from the runout conveyor. When the 45th loaded pallet reaches the downstream end of the accumulating conveyor, the leading edge of the forward pallet trips the arm of the limit switch 57, such that the limit switch signals the electrical control system to remove the train of 45 pallets for subsequent advancement to the transfer mechanism 6 and by way of the charging mechanism 8 to one of the autoclaves 10.

TRANSFER MECHANISM

The transfer mechanism, previously indicated at 6, comprises a frame fabricated from structural members (FIGS. 1, 3, 5 and 6). The frame comprises a series of vertical standards 58 having horizontal framing members 60 extending longitudinally and transversely about the upper end portion of the standards 58. The frame is stiffened by sets of diagonal braces 61 having their ends connected to the vertical standards 58. The wheels, previously indicated at 28, are mounted upon the lower ends of the vertical standards 58.

The lift frame 7, is coextensive with the transfer mechanism and comprises longitudinal and transverse horizontal framing members 62 (FIGS. 5 and 6). The lift frame resides within the vertical standards 58 which include suitable slides 63 for guiding the frame 7 in its vertical motion.

As noted earlier, the transfer mechanism 6 is shiftable transversely to three positions and is provided with three pairs of pallet supporting nails. As viewed in FIG. 5, the pairs of rails 64 are in the form of channels, the arrangement being such that the upper flanges of the channels engage the edge portions of the pallets 5, while the lower flanges of the channels act as rolling tracks for the flanged wheels which carry ram 15 of charging machine 8 as it is extended and retracted with respect to the channels.

It will be understood at this point, that the channel rails 64 of lift frame 7 are also used on the lift frame 13 of the exit mechanism 12 and in the autoclaves, such that the rim 15 always tracks upon the lower flange of any given pair of channel rails, while the upper flanges of the channel rails, in each instance, support the side edge portions of the pallets 5. Accordingly, the various sets of channel rails are designated at 64 throughout the apparatus.

As best shown in FIGS. 5 and 6, the channel rails 64 are suspended from a series of vertical hangers 65 depending downwardly from the horizontal framing members 62 of the lift frame 7. The lift frame 7 is raised and lowered by an hydraulic power unit 66 attached to one of the vertical standards 58 of the transfer mechanism 6. The frame 7 is connected to the hydraulic power unit 66 by a cable system comprising a first cable 67 and a second cable 68. Other cables of the system are located at different points to distribute the lift, all actuated by the same unit 66. The cables pass about sheaves 70–70 journaled upon the opposite sides of the horizontal frame, the cables being connected as at 71–71 to the opposite sides of the lift frame.

Power is supplied to the hydraulic unit 66 for raising and lowering the lift frame 7 by electrically operated valves (not shown) incorporated in the electrical control system. The hydraulic pressure is applied to the power unit for forward and reverse operation by the hydraulic conduits 72–72 (FIG. 5).

The lower level of the lift frame 7 is controlled by a limit switch indicated diagrammatically at 73 and the upper level is determined by the upper limit switch 74. The upper position of the lift frame 7 is indicated in broken lines in FIG. 11, in which the loaded train A of pallets has been elevated from the accumulating conveyor 2.

The three horizontal positions to which the transfer mechanism is shifted during its accumulating action are shown in FIGS. 11–14. These positions are determined by the limit switches which are interconnected in the control system so as to operate the reversible motor 30 of the transfer mechanism when the control system signals a shift, for example, after the first train A has been accumulated, as in FIG. 11.

In the present disclosure, the left-hand position of the transfer mechanism 6 is determined by the limit switch 75, which stops the motor 30 (FIG. 6) when the transfer mechanism is shifted to its starting position to receive the train A. Thereafter, upon the next signal, the motor 30 is energized to shift the mechanism 6 toward the right to receive the second train B (FIG. 12), the motor being deenergized by the second limit switch 76. After the trains A and B have been lifted from the conveyor 2, the motor 30 is energized by the control system to shift the transfer mechanism 6 to the third position (FIG. 13), the mechanism being stopped in this position by the limit switch 77. The fourth position of the transfer mechanism (FIG. 14) is determined by the limit switch 78.

The several limit switches used throughout the apparatus in controlling the travel of the components are of a commercial type in which a vane is attached to the moving part and is arranged to pass through the magnetic field of a stationary switch. The switch, in turn, transmits a signal to the control circuit. In order to provide accurate positioning of the moving component, two switches, in each instance, are mounted in alignment with one another, the first switch being arranged to slow down the operation of the driving motor to a crawl speed, the second switch being arranged to control the stopping of the part in accurate alignment with its mating part.

EXIT MECHANISM

The exit mechanism 12 (FIGS. 1, 3 and 5) is a substantial duplicate of the transfer mechanism 6, with the exception that its lift frame 13 carries two pairs of channel rails 64 instead of three pairs. As a consequence, the exit mechanism is shifted to two positions during the unloading cycle as distinguished from the three positions of the transfer mechanism 6.

The exit mechanism comprises a frame having a series of vertical standards 58 identical to those previously described, and having horizontal framing members 60. As noted earlier, the standards 58 of the exit mechanism are supported upon wheels 38 riding on the tracks 27 which also support the transfer mechanism 6.

The lift frame 13 of the exit mechanism is also similar to lift frame 7 with the exception of the width dimension. The lift frame 13 is raised and lowered by a similar hydraulic power unit 66 having first and second cable runs 67 and 68 anchored to the opposite sides of the lift frame, as described with respect to the transfer mechanism. Other cables of the system are connected to different points on the lift frame, similar to the lift frame of the transfer mechanism. The lower lever of the lift frame 13 is determined by a limit switch 80 (FIG. 5) and the upper level is determined by a limit switch 81.

The two horizontal positions to which the exit mechanism 12 is shifted during the unloading operation are determined by the limit switches 82 and 83 (FIG. 5) which control the motor 40, as previously noted (FIG. 3). The switches 82 and 83 determine the transverse shifting motions of the mechanism with reference to the discharge conveyor 14 in combination with the vertical motions of the lift frame 13, as described earlier.

CHARGING MECHANISM

The charging mechanism 8, as shown generally in FIGS. 2, 3 and 7, in general comprises a frame having horizontal framing members 84 extending longitudinally and transversely to form the base of the mechanism. The base includes undercarriages 85 at three points along the length of the base and each undercarriage includes the pairs of flanged wheels 17–17, previously described, which ride upon the tracks 16. As explained earlier, the shuttle motion is imparted to the charging mechanism 8 by the reversible motor 18 driving the chains 22–22. The charging mechanism includes brackets 86 depending downwardly and connected to the chain runs 22.

The charging ram 15 comprises two parallel ram sections 87–87 spaced apart from one another and arranged to handle the two pallet trains concurrently. The two ram sections 87–87 are in duplicate and are shifted in unison; therefore, the following description applies to both section.

Each ram section 87 is of composite construction, including a stationary base frame 88 (FIG. 15) disposed immediately above the horizontal frame 84. A composite lift frame 90 (FIGS. 15—19) is mounted above the fixed base frame 88, the lift frame 90 having a structural frame work including a series of vertical posts 91 which may be suitably braced by horizontal stringers. The arrangement provides the mounting structure for the components of both rams and for the driving mechanism of the rams, as explained below.

The composite lift frame 90 is arranged to be shifted to the three levels indicated at J, K and L (FIG. 15), so as to register with the three tiers of channel rail 64 of the autoclaves 10, as indicated at J-1, K-1 and L-1.

As best shown in FIGS. 15—19, the composite lift frame 90 comprises a pair of channel rails 64–64 secured to the framework (posts 91), and arranged to be aligned with the channel rails 64 of the autoclave, as previously indicated in FIG. 15. The lift frame 90 is raised and lowered with respect to the three positions, indicated at J, K and L by a plurality of scissors mechanisms indicated at 92, which are conventional in design.

The frame 88 includes a slotted plate 93, and the composite lift frame 90 includes a matching slotted plate 94, the opposite ends of the scissors mechanism 92 being engaged in the slots of the two plates. A power unit (not shown) is connected to each of the scissors mechanisms, the arrangement being such that the lift frame is maintained in a level plane as it is shifted vertically.

The three levels of the lift frame are controlled by an electrical control system in response to signals transmitted by the three limit switches 95, 96 and 97, shown diagrammatically in FIG. 15.

The ram 15 (FIGS. 16—19) essentially comprises a lower frame 98 having a pair of angle irons 99 spaced apart, with their lower flanges facing inwardly toward one another. The angle irons are held in spaced relationship by a series of crosspieces 100. The vertical flanges of the angle irons 99 include flanged wheels 101 arranged in pairs along the ram and riding upon the lower flanges of the channel rails 64 for longitudinal extension and retraction of the ram along the channel rails 64.

The upper, pallet-carrying section of the ram is indicated generally at 102. This portion comprises a pair of angle irons 103–103 (FIGS. 16—19) having their upper flanges facing outwardly in reverse relationship to the lower angle irons 99. The channel irons 103–103 are held in spaced relationship by a series of crosspieces 104.

As the ram assembly inserts a train of pallets into the autoclave, the pallet-carrying frame 102 is elevated slightly with respect to the lower frame 98, such that the pallets are spaced slightly above the upper flanges of the channel rails 64, the clearance being indicated at 105 in FIG. 16. After the train of pallets is inserted, the carrying frame 102 is lowered to allow the pallets to rest upon the channel rails 64, the clearance between the frame 102 and pallets being indicated at 106 in FIG. 18.

In order to obtain this vertical clearance motion, the lower frame 98 includes a series of lifting wedges 107 arranged in pairs along the frame (FIGS. 16 and 17). The pallet-carrying frame 102 includes pairs of rollers 108 tracking upon the wedges 107.

The relative vertical motion between the lower frame 98 and upper carrying frame 102 is brought about by a hydraulic power unit connected respectively to the upper and lower frames and adapted to shift the upper frame forwardly with reference to the lower frame, as indicated by the arrow M in FIG. 17. In order to lower the upper frame 103, the frame is shifted rearwardly as indicated by the arrow N in FIG. 19. The lifting and lowering movements are regulated by the electrical control system and the limit of the motion is signalled by the limit switch 110 shown in FIGS. 17 and 19.

It will be understood that the lifting action is imparted to the pallet carrying frame 102 in reverse order when the ram is retrieving the pallet trains from the transfer rack mechanism 6 (FIG. 8). In other words, the ram 15 enters the rack with carrying frame 102 in its lowered position (FIG. 18) and is raised (FIG. 16) to lift and retract the train from the channel rails.

As the ram 15 enters the autoclave (FIGS. 16 and 17) the channel rails 64 of the ram will have been aligned endwisely with the channel rails 64 of the autoclave. Accordingly, the flanged wheels 101 of the ram are transferred from the channel rails of the ram to the channel rails of the autoclave so as to support the ram as it advances through the full length of the autoclave to its opposite or closed end.

The longitudinal charging motion is imparted to the composite lift frame 90 of the parallel rams 15 by a pair of chain loops 111 (FIGS. 7 and 15). Since the chain loops are duplicates, they are described in the singular. Each chain loop 111 has its forward end passing around an idler sprocket 112. The rearward end of the chain loop 111 passes around a driving sprocket 109 which is located at the rearward end of the lift frame 90 (FIG. 7). The sprockets 109 and 112 are journaled as at 113 to the posts 91 of the lift frame 90. It will be understood that the chain loop 111 moves vertically with the lift frame assembly as the structure is shifted to its three levels J, K and L, previously described with reference to FIG. 15.

The upper run of the chain loop 111 (FIG. 15) is connected to the lower frame 98 by means of a driving lug 114 attached to the upper run of the chain and engageable with a pin 115 projecting from the lower frame 98.

The chain loop is driven preferably by a reversible electric motor (not shown) in driving connection with the driving sprocket 109 so as to advance and retract the ram. The companion ram 15 includes a similar chain loop in driving connection with the same reversible motor, so that both rams are moved in unison. The ram motor is energized in forward and reverse directions by the control system and its forward limit of travel is signalled by a limit switch indicated at 116 (FIG. 17), which may be located at any point along the lift frame to be tripped at the limits of motion of the ram, thereby to signal the electrical control system at a completion of the strokes.

AUTOCLAVES

The autoclaves 10 (FIGS. 1, 5 and 15) are of commercial design, and in the present example, are cylindrical in shape. The autoclaves 10 are mounted upon a foundation 117 (FIG. 15) to locate the autoclaves at the proper level with reference to the charging mechanism 8 and other components of the machine. The cylindrical autoclaves are secured in position upon the foundation by the brackets 118.

In the present example, the rearward end of each autoclave is closed and its forward end is closed and sealed by the door, previously indicated at 11. As noted earlier, the doors of the several autoclaves move in a vertical plane to avoid interference with the charging mechanism 8, the doors being opened and closed individually and selectively by a power mechanism (not shown). The power mechanism, in turn, is regulated by the electrical control system in accordance with the operating schedule of the system.

The autoclaves are pressure vessels to facilitate the curing process; hence, it is of importance to charge and discharge the trains of blocks and to close the doors as rapidly as possible so as to avoid interruptions in the curing process. In the present example, the autoclave includes a water tank in its lower portion. The tank includes a closure plate 120 (FIG. 15) at the forward end of the autoclave for confining a pool of water 121 in its lower portion. The water is heated by coils 122 through which heated oil is circulated to generate steam pressure.

The channel rails 64, within the autoclave, are supported in tiers, one above the other upon columns 123 (FIG. 5). The columns 123 are located at spaced points along the length of each autoclave. It will be understood at this point, that rapid deterioration of metal takes place because of the high moisture content within the autoclave. The moisture and temperature conditions are particularly injurious to mechanisms having moving parts and lubricated bearings. By virtue of the present invention, the ram 15 remains in the autoclave only a short time, and there are no mechanisms constantly exposed to the atmosphere of the autoclave during the curing treatment.

In addition to the above reference to deterioration of metals which takes place because of the high moisture within the autoclave, it should be pointed out that the channels that form the racks do not deteriorate nearly as fast as the racks formerly used, which had to be withdrawn and which later reenter the pressure chamber. The corrosive action under those conditions, as presently understood, takes place due to the change of temperature and changes in atmosphere (steam to air). The channel rails in the present structure remain inside the autoclave and thus are not subjected to this action. The steel companies can provide a formula of steel that will standup under this condition.

SEQUENCE OF OPERATION

In the present example, the blocks 4 issue from the block forming machine three to a pallet, at the rate of six pallets per minute or one pallet every 10 seconds. The accumulating belt conveyor 2 indexes as each pallet is deposited on the receiving end of conveyor 2. At this rate of production, the first two pallet trains, consisting of 90 pallets or 270 blocks, will have been accumulated during a 15 minute interval. It will be understood that the rate of production of blocks and the rate of advancement of the accumulating conveyor may be varied in accordance with the types of blocks which are being formed and other variable factors, the timing and speed in the present example being selected to illustrate the principles of the invention.

The operations of the several components of the handling apparatus are basically regulated by the speed of production of the block making machine at the rate noted above. For this purpose, there is provided a stepping or programming switch (not shown) which is interconnected with the block forming machine, so as to be advanced one step upon each cycle of operation of the forming machine. The limit switches are in electrical connection with the control system, and the control system energizes the various components of the system in proper sequence in response to the advancement of the programming switch. The limits of motion of the components, upon being initiated, are controlled by the several limit switches of the system.

A chart showing a typical 12-hour operating cycle is illustrated in FIG. 21 and corresponds with the operations signalled by the programming switch, which is preferably of the drum type.

In the present example, the limit switch 57 of the accumulating conveyor 2 signals the programming switch when the full train of 45 pallets has been accumulated. The limit switch 57 then signals the programming switch to initiate whatever operation follows in the sequence in accordance with FIG. 20.

In order to illustrate a typical sequence, the 10 autoclaves have been consecutively numbered in this system (FIG. 3). The charging mechanism 8 assumes 13 positions, 10 of which are in alignment with the autoclaves. The other three positions represent the two positions of the charging mechanism with the triple rack transfer mechanism 6 and the position of the charging mechanism 8 in alignment with the exit mechanism 12.

The position of the charger 8 (FIG. 3) represents the starting position, at which point the transfer mechaniam 6 will have shifted from its first position, as indicated by the broken line 0 to its second position. The horizontal and vertical movements of the transfer mechanism 6 are initiated by the programming switch through the control circuit, the limit of motion of the mechanism 6 and its lift frame 7 being signalled back to the programming switch by the limit switches 73—78 (FIGS. 11—14), as previously described.

The two positions of the charging mechanism 8 with reference to the transfer mechanism 6 are determined by the limit switches 124 and 125 (FIG. 3). The position of the charger with reference to the exit mechanism 12 is determined by the limit switch 126 (FIG. 3).

In the preferred example, as disclosed herein, the autoclaves 10 are charged in a scheduled sequence, preferably in consecutive order, the first train of pallets being placed in the top tier (pairs of channel rails 64) in the autoclave designated as No. 1. The second charge is inserted into the center tier, and the third pair of trains is charged into the lower tier. By virtue of this schedule, the blocks in the first-charged autoclave No. 1 are cured by the time the last autoclave No. 10 in the sequence is charged.

The arrangement is such that the blocks are retrieved from the first-charged autoclave and discharged from the system after the last consecutive autoclave is charged. The cycle is then repeated, the first autoclave again being charged as described above.

It will be understood at this point, that the control system takes into consideration the time consumed during travel of the charger 8 from its initial loading position (FIG. 3) to the most remote autoclave, in the present example, No. 1 autoclave. During the loading of the less remote autoclaves, which involves less travel time, the programming switch provides a dwell point during which the charger 8 idles temporarily.

At the start of the charging cycle, the loaded charger 8 travels to the No. 1 autoclave, at which point the last limit switch 127 of the series, which is energized at this time by the control circuit, is tripped. This signals the control circuit to deenergize the charger motor 18, (FIG. 3). When the limit switch 127 is tripped, the control system also causes the door 11 of the No. 1 autoclave to open.

At this point, a signal is sent to the programming switch, such that the control system energizes the power unit (not shown) of the lift frame 13 to shift the lift frame to the proper level with respect to the channel rails 64 of the autoclave. When the proper level is reached, the appropriate limit switch 95—97 (FIG. 15) of the charger is tripped so as to signal the programming switch.

At this point, the programming switch energizes the power unit (not shown) of the charger to advance the rams 15 (with the train of pallets elevated above the channel rails). Upon being fully extended into the autoclave, the limit switch 116 (FIG. 17) of the charger signals the programming switch, causing the lift frame 90 to be lowered so as to deposit the train upon the channel rails, then to be retracted.

When fully retracted, the limit switch 116 of the charger ram 15 signals the control system, causing the door of the No. 1 autoclave to be closed, and also energizes the motor 18 in the reverse direction, so as to return the charger to the transfer mechanism 6.

During this operation, the block forming machine will have continued forming the blocks and advancing them upon the accumulating conveyor 2. With the transfer mechanism 6 in its second position, the third train of blocks C (FIG. 13) will have been accumulated. The charger 8 dwells in this position until the second trail of pallets G is accumulated on the next rack of the transfer mechanism for subsequent transfer to the autoclave which is next scheduled to be opened.

In the preferred cycle of operation, a given autoclave is opened each 15 minutes for a period of 2 minutes in order to insert the two trains. This operation continues, such that during a 24-hour period (FIG. 21) the blocks in any given autoclave will have received a 2-hour presetting period and a 5-hour pressure period.

During the first cycle of operation described above, the components operate through a 7½ minute series of operations, as illustrated by the line P in FIG. 20. During the next 7½ minute portion of the cycle (line Q - FIG. 20) the charger will travel to a selected autoclave which will have treated its blocks for the specified curing period as shown in FIG. 21. During the retrieving and discharging period, as illustrated in the (line Q - FIG. 20), the charger, which will have traveled to the No. 1 autoclave, or any other autoclave in accordance with the schedule, will retract with the load (two trains) then travel to the exit mechanism 12, (FIG. 5) At this point the ram 15 of the charger 8 enters the exit rack, lowers the two trains upon the channel rail 64 of the rack and retracts. At this point, the charger again travels to the triple rack of transfer mechanism 6 and picks up the next two trains from the transfer mechanism 6 for transfer of the trains to a selected autoclave.

As noted earlier, the present apparatus may be set up for continuous operation through a 24 hour schedule, during which period the components are operating continuously transferring the blocks from the forming machine to the autoclaves and from the autoclaves after the curing period to the exit mechanism. A 24-hour portion of the 24 hour schedule is illustrated graphically in FIG. 21.

It will be understood, that the present block handling apparatus may be utilized in systems having less than the number of autoclaves or curing chambers illustrated, in which case, the schedule is revised to accommodate the number of autoclaves. The same system may be utilized in treatment plants utilizing a continuous treatment chamber, such as an elongated tunnel, through which the blocks are advanced at a rate and temperature sufficient to treat the blocks as they advance from the receiving end to the discharge end of the tunnel.

I claim:
1. In an apparatus for handling palletized articles as the pallets issue from a forming machine, a transfer mechanism comprising:
a conveyor for accumulating a train of loaded pallets as the pallets issue from the forming machine;
a transfer mechanism mounted parallel with the conveyor and generally coextensive therewith, the transfer mechanism being shiftable transversely to a plurality of positions relative to the conveyor;
a vertically shiftable lift frame mounted within the transfer mechanism and generally coextensive therewith, the lift frame having at least two sets of lift rails extending parallel with the conveyor arranged to straddle the conveyor;
first means for shifting the lift frame vertically, the lift frame normally residing in a plane with the first set of lift rails disposed below the plane of the conveyor and shiftable upwardly to engage the edge portions of a first train of loaded pallets, thereby to lift said first train of pallets from the conveyor;
second means for shifting the transfer mechanism transversely;
the transfer mechanism being shifted transversely in parallelism with the conveyor by said second means with the lift mechanism elevated vertically above the conveyor after the first train of pallets is lifted above the conveyor by the lift frame;
the lift frame thereafter being shifted downwardly by said first means to lower the second set of rails below the plane of the conveyor;
said conveyor thereafter accumulating a second train of loaded pallets which are advanced by the said conveyor;
the lift frame thereafter being shifted by the first means upwardly to engage the edge portions of the second train of loaded pallets, thereby to lift the second train of loaded pallets from the conveyor after the second train of pallets has been accumulated on the conveyor.
2. In an apparatus for handling palletized articles as the loaded pallets issue from a forming machine, a discharge mechanism for discharging the loaded pallets from the apparatus, said discharge mechanism comprising:
a discharge conveyor;
a discharge frame extending parallel with the discharge conveyor and generally coextensive therewith;
first means for shifting the discharge frame transversely with respect to the discharge conveyor to a plurality of positions parallel with the conveyor;
a lift frame coextensive with the discharge frame and mounted within the discharge frame for vertical motion relative to the discharge conveyor;
respective sets of lift rails mounted on said lift frame and extending in parallel relationship with the conveyor, and arranged to straddle the conveyor;
second means for shifting the lift frame upwardly, thereby to elevate the rails of the lift frame to a plane above the discharge conveyor to receive respective trains of loaded pallets in parallel relationship with the end portions of the trains of pallets resting upon the respective sets of lift rails;
second means thereafter shifting the lift frame downwardly, thereby to dispose the first set of rails in a plane below the discharge conveyor to deposit a first train of loaded pallets on the conveyor for discharge from the apparatus;
said second means thereafter shifting the lift frame upwardly to elevate the sets of rails above the plane of the discharge conveyor after the loaded pallets are advanced beyond the discharge frame by the advancement of the discharge conveyor;
the first means thereafter shifting the discharge frame transversely to align a second set of lift rails with the discharge conveyor with the rails disposed in a plane above the conveyor in a position to deposit a second train of pallets upon the discharge conveyor;
said second means thereafter shifting the discharge frame downwardly below the discharge conveyor to deposit the second train of pallets upon the discharge conveyor.